G. W. HOWDEN.
ELECTRIC GENERATING PLANT.
APPLICATION FILED APR. 12, 1916.
1,355,672.
Patented Oct. 12, 1920.
3 SHEETS—SHEET 1.
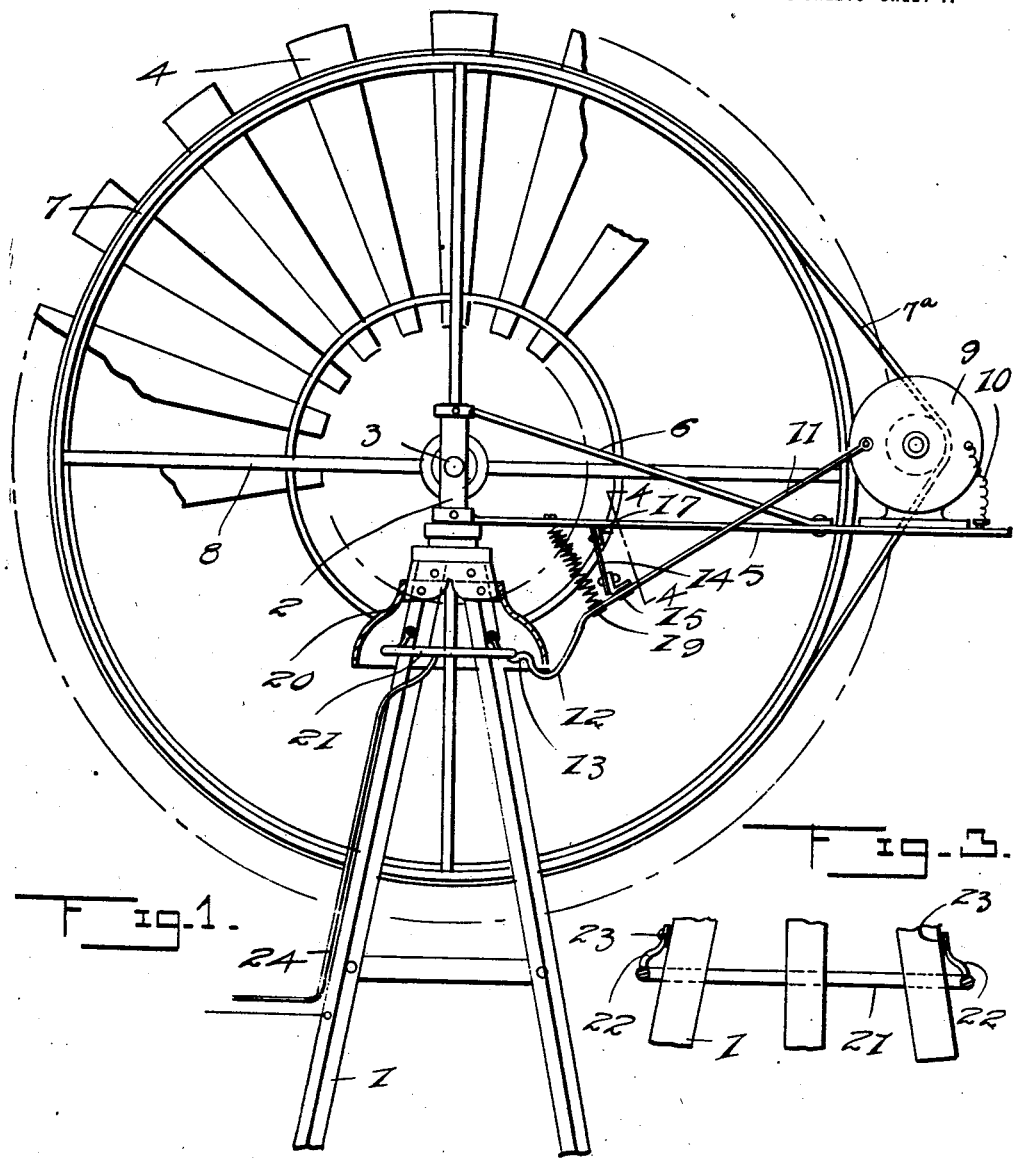
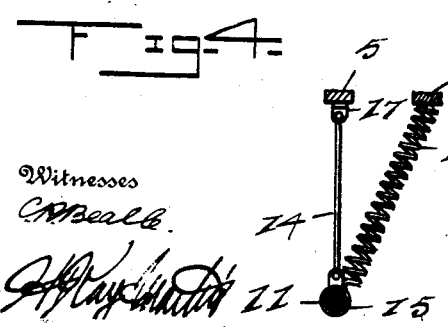
Witnesses
Inventor
G. W. Howden,
By
Attorney

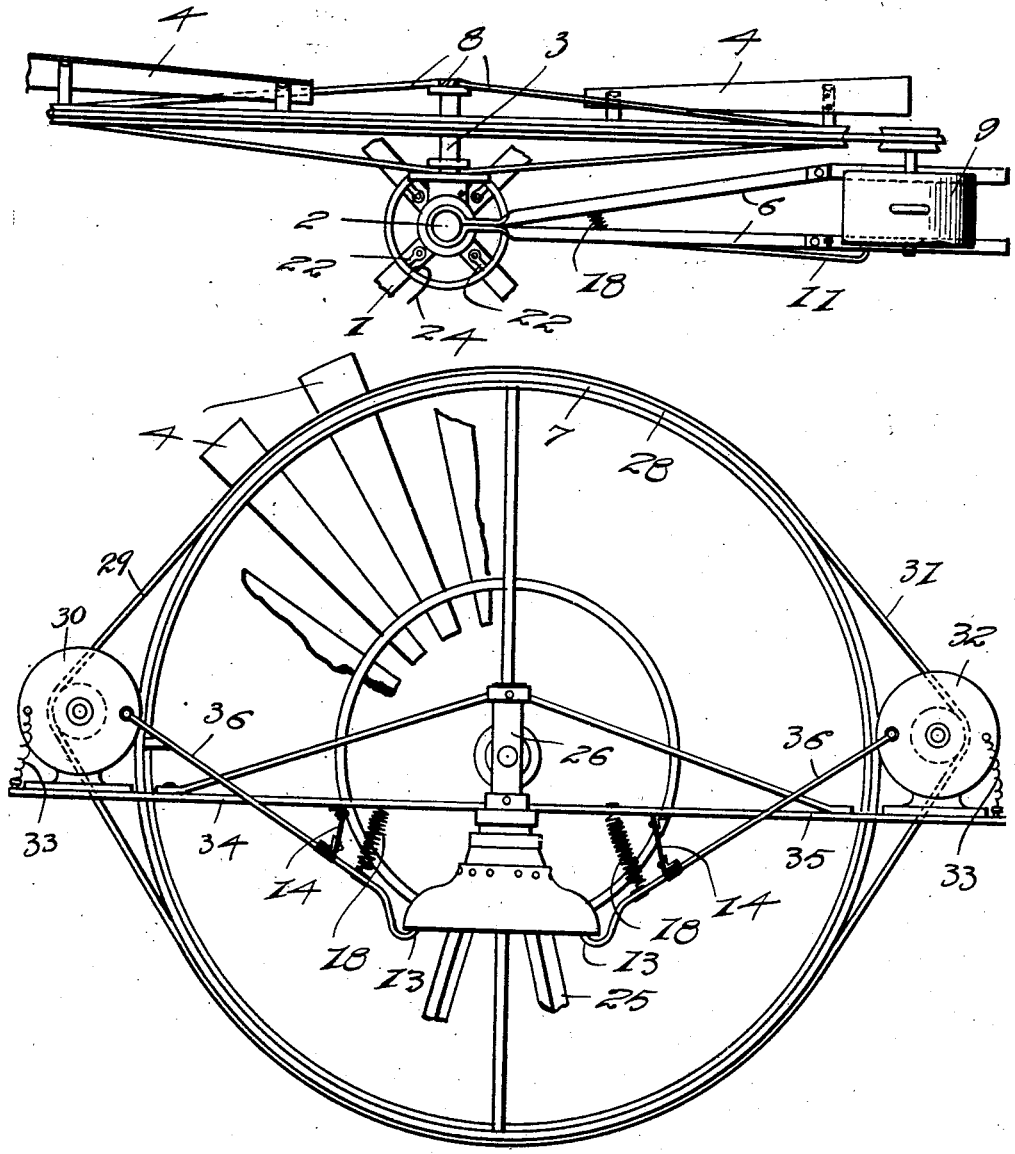

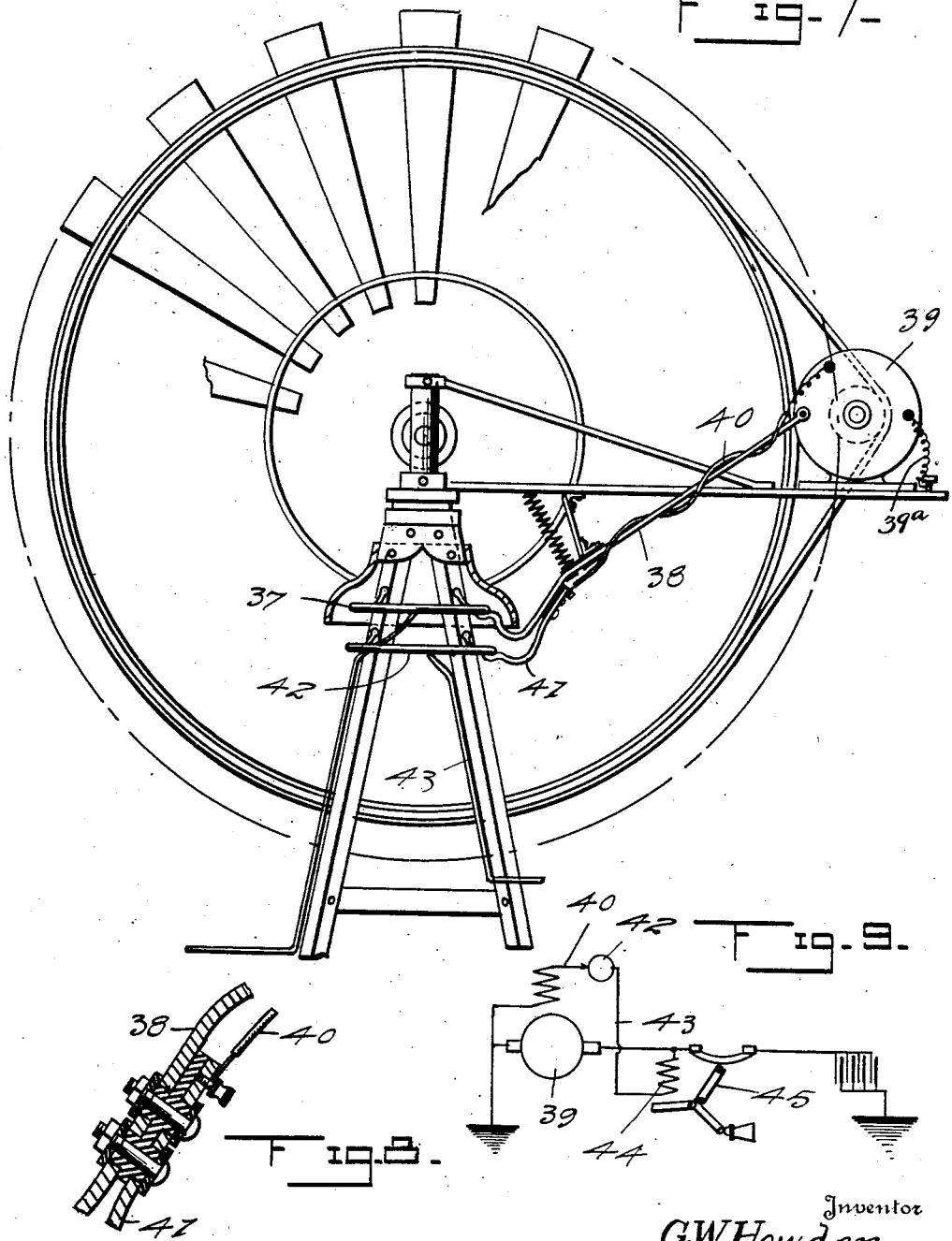

UNITED STATES PATENT OFFICE.

GEORGE W. HOWDEN, OF HOLLY, MICHIGAN.

ELECTRIC GENERATING PLANT.

1,355,672.　　　　Specification of Letters Patent.　　Patented Oct. 12, 1920.

Application filed April 12, 1916. Serial No. 90,599.

*To all whom it may concern:*

Be it known that I, GEORGE W. HOWDEN, a citizen of the United States, residing at Holly, in the county of Oakland and State of Michigan, have invented certain new and useful Improvements in Electric Generating Plants; and I do hereby declare the following to be a full, clear, and exact description of the invention, such as will enable others skilled in the art to which it appertains to make and use the same.

This invention relates to new and useful improvements in electric generating plants and the principal object of the invention is to provide a generator adapted to be attached to and operated by a windmill.

Another object of the invention is to provide a device which will permit the windmill to make an entire revolution so as to adjust itself to the proper position with relation to the direction which the wind is blowing.

A further object of the invention is to provide a novel means for conducting the power generated by the windmill to suitable conductor wires and yet allow the head of the windmill to rotate freely.

Still another object of the invention is to provide a hood for protecting the conductor ring from the effects of the elements.

With these and other objects in view, the invention consists in the novel combination and arrangement of parts which will be fully set forth in the following specification and accompanying drawings, in which:—

Figure 1 is a view of the upper end of a windmill showing this improved device applied thereto.

Fig. 2 is a bottom plan view of Fig. 1.

Fig. 3 is an enlarged detail view illustrating the method of supporting the conductor ring in place.

Fig. 4 is a sectional view on line 4—4 of Fig. 1.

Fig. 5 is an enlarged sectional view illustrating in detail the method of connecting the conductor wire to the conductor ring.

Fig. 6 is a view similar to Fig. 1 showing a modified form of the device.

Fig. 7 is a view similar to Fig. 1 showing the device as it would be constructed when an automatic cut-out is used for disconnecting the generator from the power consuming source when the speed of the windmill drops below a charging value.

Fig. 8 is an enlarged detail sectional view showing the method of connecting the arms, and Fig. 9 is a wiring diagram of the structure illustrated in Fig. 7.

Referring to the drawing, the numeral 1 designates the frame of the windmill provided at its upper end with the rotating head 2. Journaled in the head 2 is a suitable shaft 3 having mounted thereon the wind wheel 4 and extending outwardly from the head 2 at right angles to the axis of the shaft 3 is a suitable supporting arm 5 which is held rigid by suitable braces 6. Secured to the wheel 4 is a grooved ring 7 which extends therearound near its periphery and is held in proper place by suitable spokes 8 which radiate outwardly from the shaft 3. A suitable generator 9 is secured to the outer end of the bracket 5 and one terminal thereof is connected by a wire 10 to the bracket. The opposite terminal of the generator has pivoted thereto the conductor arm which will be more fully hereinafter described.

The conductor arm above referred to comprises the arm 11 formed at its lower terminal with the angular extension 12 which is bent back upon itself and formed with a contact hook 13. A guide link 14 is pivoted to the sleeve 15 which is insulated from the arm but surrounds the same and the upper end of this link is pivoted as at 17 to the under side of the bracket 5. A retractile coil spring 18 is connected to the under side of the bracket 5 and has its lower terminal connected to a sleeve 19 which is insulated from the arm but surrounds the same as clearly illustrated in the drawing. It will thus be seen that the arm 11 normally tends to move upwardly under the influence of the spring 18 and is thus held in contact with the conductor ring which will be more fully hereinafter described. The link 14 serves to guide the movement of the arm 11 and is so arranged as not to resist the movement of the arm under the influence of the spring 18, as is clearly indicated in Fig. 4.

Secured to the frame 1 slightly below the head 2 is a suitable hood 20 which covers the upper portion of the frame and shields the conductor ring 21. This conductor ring is formed of any suitable conducting material and has a plurality of arms 22 projecting upwardly therefrom which are attached to the frame 1 but insulated therefrom by a suitable insulating block 23. The hook 13 of the arm 11 bears against the under side of the ring 21 and it will thus be seen that regardless of the position of the bracket 5 around the vertical axis of the frame contact will be made with the ring by the hook 13. A suitable conductor wire 24 is secured to the ring 21 in the manner illustrated in Fig. 5 and extends downwardly by one of the legs of the frame as clearly shown in Fig. 1. It will thus be seen that the current generated by the dynamo 9 as it is driven from the wind wheel operated wing 7 through the belt 7ª will be carried through the wire 10 to the frame and thence to the power consuming device and back to the generator through the conductor 24.

In the modified form of the invention illustrated in Fig. 6, the frame is designated by the numeral 25 and is provided with the swivel head in which a shaft similar to the shaft 3 is journaled and on which the wheel 27 is secured. A pair of pulley wheels 28 are secured to the shaft and one of said wheels is surrounded by a belt 29 for driving the generator 30 while the opposite pulley wheel is provided with a belt 31 for driving the generator 32. One terminal of each generator is grounded through a wire 33 to the supporting brackets 34 and 35 which support the generators 30 and 32 respectively and the opposite terminal of each generator is provided with a pivoted contact arm 36 for connection with a ring similar to the ring 21.

In Fig. 7 a further modification is shown in which the structure of the collar and the wind wheel remain essentially the same as does the generator support and it will be seen that the main collector or conductor ring heretofore described is used in connection with the arm of the generator. In the present illustration however, the main ring is designated by the numeral 37 and is adapted to be engaged by the hooked end of the arm 38 mounted on the generator 39 which is preferably shunt wound as illustrated in Fig. 9. One pole of the generator is grounded as indicated at 39ª and the opposite terminal of the shunt field winding is connected by the wire 40 to the auxiliary contact arm 41 which engages the secondary contact ring 42 which is supported by the windmill standard and it will thus be seen that the current will flow through the wire 40 and the arm 41 into the ring 42 as well as through the arm 38 and the ring 37. Leading from the ring 42 is a wire 43 which is connected to the coil 44 of a suitable underload circuit breaker designated by the numeral 45 and it will thus be seen that when the current in the field winding of the generator drops below a predetermined value the coil 44 will be so weakened as to cause the operation of the circuit breaker 45 thereby breaking the circuit. When the generator is rotating at a charging value the circuit breaker may be manually turned to initial position.

While in the foregoing there has been shown and described the preferred embodiment of this invention, it is to be understood that such changes may be made in the combination and arrangement of parts as will fall within the spirit and scope of the appended claim.

What is claimed is:—

In combination, a frame, a head swiveled upon said frame, a wind wheel journaled upon said head, a horizontal bracket carried by said head, a generator mounted on said bracket, a driving connection between said wind wheel and said generator, a ring insulated from and secured to said frame below said bracket, a hood secured to said frame above said ring and extending about and below said ring, an arm pivoted at its upper end to and electrically connected with one terminal of the generator, said arm having its lower end bent to pass said hood and formed at its lower terminal with an annular extension bent upwardly and formed with a wiping contact engaging said ring, a link pivoted to said bracket and said arm, and a contractile spring secured to said bracket and said arm to resiliently retain said wiping contact of the arm in contact with said ring.

In testimony whereof I affix my signature in presence of two witnesses.

GEORGE W. HOWDEN.

Witnesses:
   W. F. OSTENDORF,
   CHAS. J. CUMMINGS.